United States Patent
Sogge et al.

(10) Patent No.: US 8,151,208 B2
(45) Date of Patent: Apr. 3, 2012

(54) WORKFLOW TRACKING INFORMATION PREVIEW

(75) Inventors: Shiela Sogge, Barnesville, MN (US); John Healy, West Fargo, ND (US); Ryan Munson, Fargo, ND (US); Jeff Anderson, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 12/027,966

(22) Filed: Feb. 7, 2008

(65) Prior Publication Data

US 2009/0204897 A1 Aug. 13, 2009

(51) Int. Cl.
*G06F 3/048* (2006.01)
*G06F 3/01* (2006.01)

(52) U.S. Cl. ......... 715/772; 715/704; 715/764; 715/853

(58) Field of Classification Search ............ 715/704, 715/764, 772, 784, 853, 967
See application file for complete search history.

(56) References Cited

U.S. PATENT DOCUMENTS

| | | | | |
|---|---|---|---|---|
| 5,517,663 A * | 5/1996 | Kahn | ............. | 345/473 |
| 5,774,661 A | 6/1998 | Chatterjee et al. | | |
| 5,818,715 A * | 10/1998 | Marshall et al. | ........... | 705/8 |
| 5,890,133 A * | 3/1999 | Ernst | ............. | 705/7 |
| 5,987,422 A * | 11/1999 | Buzsaki | ............. | 705/9 |
| 6,003,011 A * | 12/1999 | Sarin et al. | ............. | 705/9 |
| 6,243,615 B1* | 6/2001 | Neway et al. | ........... | 700/108 |
| 6,295,061 B1* | 9/2001 | Park et al. | ........... | 715/764 |
| 6,349,238 B1* | 2/2002 | Gabbita et al. | ........... | 700/101 |
| 6,535,907 B1* | 3/2003 | Hachiya et al. | ........... | 709/202 |
| 6,860,422 B2 | 3/2005 | Hull et al. | | |
| 6,990,636 B2* | 1/2006 | Beauchamp et al. | ........ | 715/764 |
| 7,100,147 B2 | 8/2006 | Miller et al. | | |
| 7,114,037 B2* | 9/2006 | Agarwal et al. | ........... | 711/143 |
| 7,168,077 B2* | 1/2007 | Kim et al. | ........... | 718/106 |
| 7,184,966 B1* | 2/2007 | Parsonnet et al. | ........... | 705/8 |
| 7,289,966 B2 | 10/2007 | Ouchi | | |
| 7,340,679 B2* | 3/2008 | Botscheck et al. | ........... | 715/738 |
| 7,379,945 B1* | 5/2008 | Hirsch et al. | ........... | 1/1 |
| 7,581,011 B2* | 8/2009 | Teng | ............. | 709/229 |
| 7,653,566 B2* | 1/2010 | Kim et al. | ........... | 705/9 |
| 7,802,174 B2* | 9/2010 | Teng et al. | ........... | 715/200 |
| 2002/0070953 A1 | 6/2002 | Barg et al. | | |
| 2002/0075293 A1* | 6/2002 | Charisius et al. | ........... | 345/704 |
| 2002/0138577 A1* | 9/2002 | Teng et al. | ........... | 709/205 |

(Continued)

OTHER PUBLICATIONS

"ActiveWorkFlow," http://www.activewizard.com/products/activeworkflow.jsp [last accessed Oct. 15, 2008], copyright 2006 Active Wizard, 1 page.

(Continued)

*Primary Examiner* — Nicholas Augustine
(74) *Attorney, Agent, or Firm* — Perkins Coie LLP (57) ABSTRACT

A method and system for presenting workflow tracking information for approval workflows assigned to business objects is provided. The approval system receives from a user a request to display the workflow for a business object and a workflow that has been assigned to that business object. The current state of a workflow is defined by tracking information that may include a workflow approval status, an originator name of the business object, and multiple steps of the assigned workflow. Each step of a workflow may include a step name, a step approval status, approver tracking information, and optionally next steps. Each next step of the step is itself a step that may include additional next steps. The approval system may generate and display a tree-like representation of the current state of a workflow for a business object based on the tracking information.

20 Claims, 7 Drawing Sheets

U.S. PATENT DOCUMENTS

| | | | |
|---|---|---|---|
| 2003/0197733 A1* | 10/2003 | Beauchamp et al. | 345/764 |
| 2005/0131750 A1 | 6/2005 | Kogan et al. | |
| 2005/0149908 A1* | 7/2005 | Klianev | 717/109 |
| 2005/0257136 A1* | 11/2005 | Charisius et al. | 715/511 |
| 2007/0043609 A1 | 2/2007 | Imam et al. | |
| 2007/0061182 A1 | 3/2007 | Brooks et al. | |
| 2007/0130197 A1 | 6/2007 | Richardson et al. | |
| 2007/0208606 A1 | 9/2007 | Mackay et al. | |
| 2008/0209417 A1* | 8/2008 | Jakobson | 718/100 |
| 2008/0249816 A1* | 10/2008 | Khalilian et al. | 705/7 |

OTHER PUBLICATIONS

"Control your Business Processes with Automated Workflows," copyright 2007 ColumbiaSoft Corporation, http://columbiasoft.staging.site9.com/Resources/Category/0001/000087/ds-workflow.pdf [last accessed Oct. 15, 2008], 2 pages.

"Working with Routed Documents," https://medical.filebound.com/help/Working_with_Routed_Documents.htm [last accessed Nov. 30, 2007], 4 pages.

* cited by examiner

WORKFLOW TRACKING INFORMATION PREVIEW

BACKGROUND

Many business applications have been developed to meet the various needs of organizations, such as companies, non-profit organizations, and governmental agencies. These business applications may include customer relationship management ("CRM") applications, inventory management applications, human resource applications, accounting applications, payroll applications, project management applications, and so on. Each of these business applications needs to manipulate data of the organization. For example, a CRM application of an organization may need to track requests for proposals received from customers of the organization and submission of the responses prepared by the organization. As another example, a payroll application of an organization may need to track the salaries of its employees along with requests for salary increases and their approvals.

Data of an organization may be represented as "business objects" or documents corresponding to various tasks performed by the organization. For example, a CRM application may have business objects that represent requests for proposals and business objects that represent the responses. A payroll application may have business objects that represent requests for salary adjustments. As another example, an accounting application may have business objects that represent purchase orders.

Many business objects of business applications may need to go through an approval process. For example, a response to a request for a proposal may need to be approved by the president of the organization, the accounting department of the organization, and an engineering committee of the organization. Within the accounting department, the response may need to be approved by members of an audit committee and by the chief financial officer. The response may need to be approved by a majority of the members of the engineering committee. In large organizations, the approval process can be a very complex process in which certain approvals may not be needed depending on attributes of the business object (e.g., a purchase order for less than $100), the approval of one department depends on the approval of various members of the department, one approval depends on the outcome of a prior step (e.g., the approval of the president is only requested after approval by the accounting department or only requested when the accounting department does not approve), and so on.

Many business applications provide a workflow management capability that allows an organization to define how data of the organization is to be processed. For example, a customer service department of an organization may define a workflow for how complaints are processed. The department may define a workflow that directs each complaint to be stored in a complaint log and sent to an initial screener. The initial screener may annotate the complaint before it is forwarded for review to both the department manager and a customer service representative. Depending on the recommendations of the reviews, the complaint may be forwarded to an automated response system or to an executive for further review. In a manufacturing environment, a workflow may specify the workstations that need to process a product and the order in which they need to process the product.

The approval process for a business object is a type of workflow. Thus, the workflow capabilities of a business application can be modified to support the tracking of approvals of business applications. Complex approval workflows can have many parallel approval paths with many serial approval steps in a path. Each path may branch into multiple other paths resulting in a complex tree-like structure. The existing user interfaces for displaying the information about an approval workflow have not allowed a user to easily grasp the overall status of such complex approval workflows including statuses of both past (e.g., already approved) and future (e.g., not yet approved) steps.

SUMMARY

A method and system for presenting workflow tracking information for approval workflows assigned to business objects is provided. The approval system receives from a user a request to display workflow tracking information for a business object and a workflow that has been assigned to that business object. The workflow tracking information describes the current state of the approval process for that business object. The approval system may send to a workflow server a request to retrieve tracking information for the business object and its workflow. In response to the request, the approval system receives from the server the requested tracking information for the business object and its assigned workflow. The tracking information may include a workflow approval status, an originator name of the originator of the business object, and multiple steps of the workflow. Each step of a workflow may include a step name, a step approval status, approver tracking information, and optionally next steps. Each instance of the approver tracking information includes an identification of an approver and an approver approval status. Each next step of the step includes one or more steps. Upon receiving the tracking information, the approval system may generate and display a tree-like representation of the current state of a workflow for a business object including statuses of both past and future steps. The display indicates the workflow approval status and the originator along with a tree-like representation of the steps. The approval system may represent each step as a node of the tree-like representation in which each next step is represented as a child node of the step. Each node for a step indicates the step approval status and the approver tracking information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for presenting workflow tracking information for approval workflows assigned to business objects is provided. A workflow specifies the approval steps for a business object. For example, the workflow may specify that a purchase order is to be approved by both an accounting department and a budgeting department. Once a workflow for a certain type of business object is defined and activated, business objects can be submitted to the workflow for approval. In some embodiments, an approval system receives from a user a request to display the workflow for a business object and a workflow that has been assigned to that business object. The approval system may initiate workflows automatically for business objects when they are created or originated or when they are submitted for approval by a user. The approval system may notify the approvers when their approval is needed and track the approval process. When requested by a user, the approval system may generate and display a tree-like representation of the current state of a workflow for a business object that includes statuses of both past and future steps. To determine the current state of a workflow, the approval system may send to a workflow server a request to retrieve tracking information for a business object and its assigned workflow. For example, a request may include an organization identifier, a purchase order number, and an indication of a purchase order workflow. In response to the request, the approval system receives from the server the requested tracking information for the business object and its workflow. The tracking information may include a workflow approval status, an originator name of the originator of the business object, and multiple steps of the assigned workflow. Each step of a workflow may include a step name, a step approval status, approver tracking information, and optionally next steps. Each instance of the approver tracking information includes an identification of an approver and an approver approval status. Each next step of the step includes one or more steps. Thus, the steps of the approval workflow may be recursively defined. Upon receiving the tracking information, the approval system generates a display of the information. The display indicates the workflow approval status and the originator along with a tree-like representation of the steps. The approval system may represent each step as a node of the tree-like representation in which each next step is represented as a child node of the step. Each node for a step indicates the step approval status and the approver tracking information. The approval system then outputs the generated display to the user. In this way, the approval system allows the tracking information of a workflow to be graphically displayed so that a user is provided with an indication of the overall status of the approval process.

In some embodiments, the approval system may store the tracking information of a workflow for a business object in a data structure that contains enough information to support the display of a tree-like representation of a workflow. The data structure may include an organization identifier that identifies the organization associated with the business object. It may include a business object identifier that identifies the business object, time tracking information for the workflow indicating the timing of the approval process for the workflow, and a workflow approval status that indicates the current approval status of the workflow. The data structure may also include an originator name (or other identifier) of the person who submitted the business object for approval and multiple steps. Each step may include a step approval status, one or more instances of approver tracking information, a step name, time tracking information, and optionally next steps. Each instance of approver tracking information includes the name (or other identifier) of an approver and the approver's approval status. Each next step may include one or more steps such that at least one of the steps includes a next step.

Figure 1:
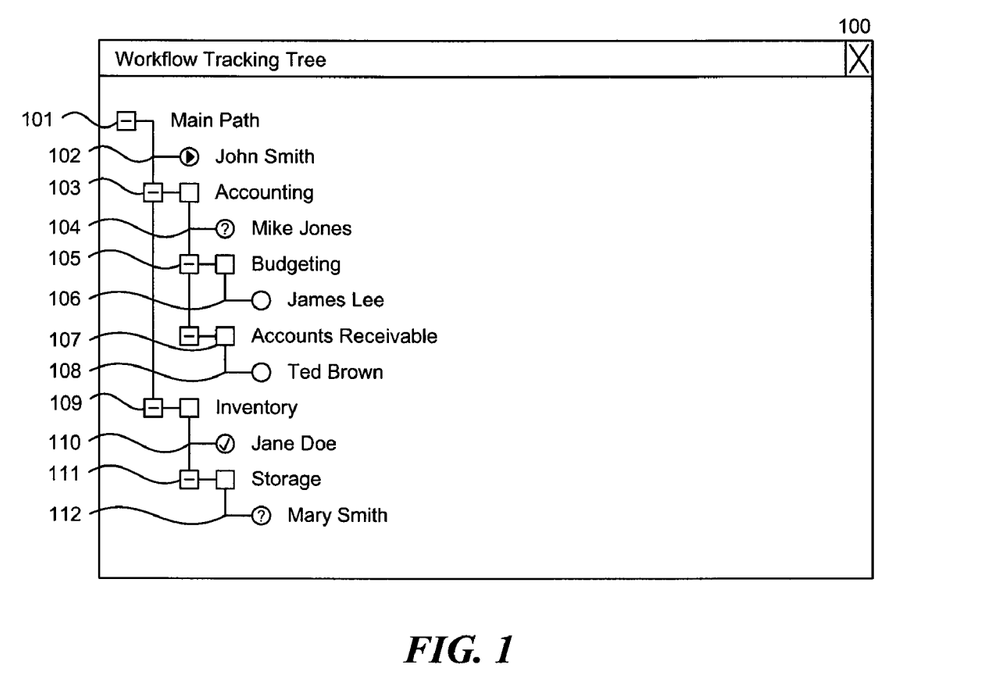
FIG. 1 illustrates a display page that displays a tracking tree for a purchase order in some embodiments.

FIG. 1 illustrates a display page that displays a tracking tree for a purchase order in some embodiments. The display page 100 includes a tracking tree 101. The tracking tree includes at the highest level an originator John Smith 102, an accounting step 103, and an inventory step 109. The accounting step 103 indicates that the accounting department is to approve the business object, and the inventory step 109 indicates that the inventory department is also to approve the business object. The accounting step 103 and the inventory step 109 are parallel steps in that the approval by the accounting department is not dependent on the approval by the inventory department, and vice versa. The tracking tree indicates that the approver for the accounting step 103 is approver Mike Jones 104 and that the accounting step 103 includes the next steps of a budgeting step 105 and an accounts receivable step 107. The budgeting step 105 and the accounts receivable step 107 are parallel steps that are dependent on approval by the accounting step 103. A second step is dependent upon a first step when the approval of the first step is needed before approval of the second need be requested. For example, if the accounting step 103 results in the purchase order being rejected, then the purchase order is rejected and there is no need to seek approval of other steps. Moreover, the approval system will seek approval based on the budgeting step 105 and the accounts receivable step 107 only after the accounting step 103 results in an approval. The tree indicates that the budgeting step 105 has an approver James Lee 106 and that the accounts receivable step 107 has an approver Ted Brown 108. The tree indicates that the inventory step 109 has an approver Jane Doe 110 and a storage step 111 as its next step. The tree indicates that the storage step 111 has an approver Mary Smith 112.

The approval statuses for the workflow, the steps, and the approvers may be represented by icons to the left of the originator name, the step names, and the approver names. For example, the icon to the left of the originator John Smith 102 indicates that the workflow has been submitted, the icon to the left of the approver Mike Jones 104 indicates that approval is pending, and the icon to the left of the approver Jane Doe 110 indicates that that approval has been granted. One skilled in the art will appreciate that the approval statuses can be displayed in various ways such as by text displayed to the right of the name (e.g., "John Smith (Submitted)"), by the color of the name (e.g., red to indicate rejected), and so on. The dashes to the left of the step names allow a user to collapse the display of information for that step. When a dash is selected by a user, it is replaced by a plus for use in expanding a collapsed step. The approval system may also display an indication that the approval for certain steps is not needed. For example, if the accounting step 103 is only needed when the value of the purchase order is greater than $100, then the approval system may indicate that the step is no longer needed by graying out the step, by displaying the step in red, and so on. In general, each step of a workflow may have a condition that needs to be satisfied before the approval of that step is needed. The approval system may also display an indication of the type of approval needed for a step that includes multiple approvers. For example, the type of approval may indicate that the approval of only one of the approvers is needed, the approval of all the approvers is needed, the approval of a majority of the approvers is needed, and so on.

Figure 2:
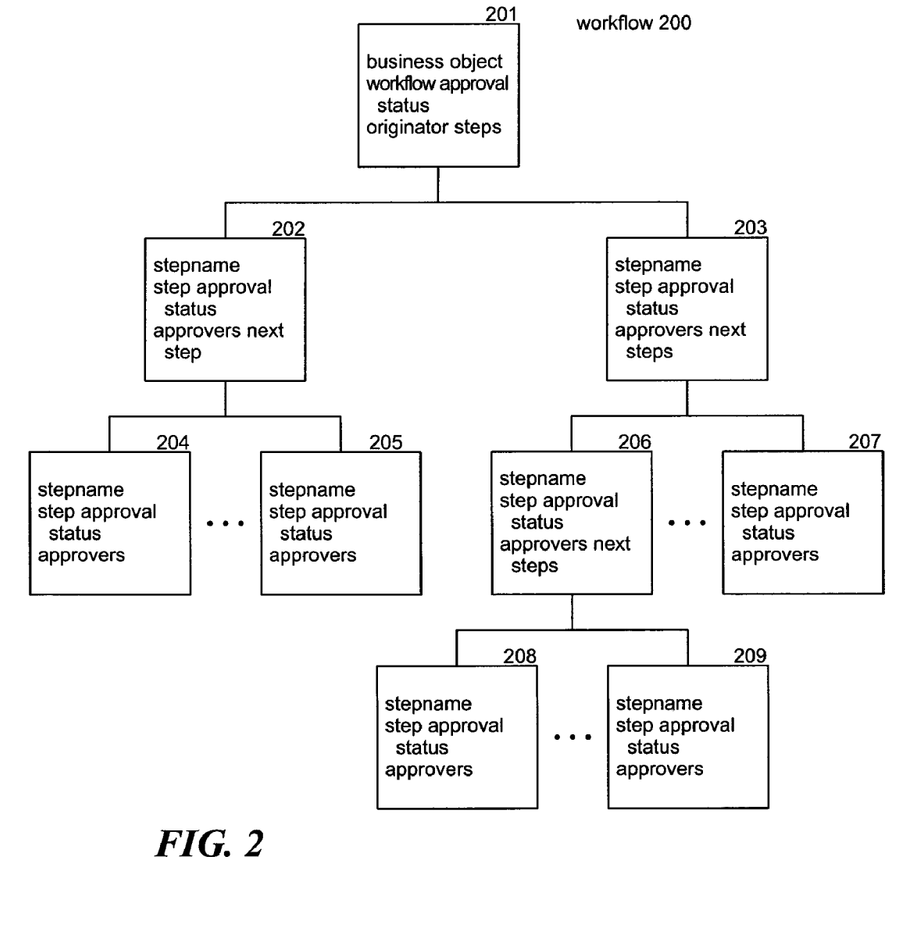
FIG. 2 illustrates the overall organization of a workflow definition in some embodiments of the approval system.

FIG. 2 illustrates the overall organization of a workflow definition in some embodiments of the approval system. The steps of a workflow 200 are represented by nodes 202-209. The overall workflow includes a root node 201 representing a main path of the workflow. The root node 201 includes an identifier of the business object, the workflow approval status, the originator name, and the steps of the workflow. The highest-level steps of the workflow are represented by nodes 202 and 203. The ellipsis between nodes indicates that a workflow may have any number of steps at that level. Each node 202 and 203 includes a step name, a step approval status, approver tracking information, and next steps. The next steps of the node 202 are represented by nodes 204 and 205. Nodes 204 and 205 include a step name, a step approval status, and approver tracking information. Nodes 204 and 205 have no next steps. The next steps of the node 203 are nodes 206 and 207. The node 206 includes a step name, a step approval status, approver tracking information, and next steps. Nodes 208 and 209 represent the next steps of node 206. Nodes 207, 208, and 209 include a step name, a step approval status, and approver tracking information. Nodes 207, 208, and 209 have no next steps. The lines between the nodes indicate the relationship between steps and their next steps. One skilled in the art will appreciate that a workflow may be displayed in an arrangement as shown by FIG. 2.

The approval system may include a server-side component and a client-side component. The client-side component may execute on a client and provide a user interface through which a user can view and modify workflow information that is stored on a server by the server-side component. When a user requests to display tracking information for a workflow of a business object, the client generates a request and forwards that request to the server. Table 1 illustrates the information of a get tracking information request. Lines 1-8 delimit the overall request. Line 4 specifies a business object key that identifies a business object. Line 5 specifies an association key that identifies the combination of a business object approval workflow and its organization.

TABLE 1

Get Tracking Information Request Definition

| | |
|---|---|
| 1. | <s:element name="GetTrackingInformationRequest"> |
| 2. |   <s:complexType> |
| 3. |     <s:sequence> |
| 4. |       <s:element minOccurs="0" maxOccurs="1" name="key" type="tns:BusinessObjectKey" /> |
| 5. |       <s:element minOccurs="0" maxOccurs="1" name="associationKey" type="tns:WorkflowAssociationKey" /> |
| 6. |     </s:sequence> |
| 7. |   </s:complexType> |
| 8. | </s:element> |

Table 2 illustrates a get tracking information response. Lines 1-58 delimit the overall response. Lines 1-7 define tracking information as a "tracking" type. Lines 9-19 define the tracking type. The tracking type includes an organization key at line 11, a business object key at line 12, an originator at line 13, time tracking information at line 14, steps at line 15, and a workflow approval status at line 16. The organization key identifies the organization associated with the business object. The business object key identifies the business object. The originator identifies the name of the originator. The time tracking information provides time information for the workflow. The steps define the steps of the workflow. The workflow approval status indicates the overall status of the workflow as illustrated by Table 3. Lines 21-28 define the time tracking type. The time tracking type includes an end time at line 23, a start time at line 24, a down days count at line 25, and a due date at line 26. Lines 36-44 define a tracking step. A tracking step includes a step approval status at line 38, approver tracking information at line 39, a step name at line 40, time tracking information at line 41, and next steps at line 42. Each next step is defined recursively as steps. Lines 46-58 define the approver tracking information.

TABLE 2

Get Tracking Information Response Definition

| | |
|---|---|
| 1. | <s:element name="GetTrackingInformationResponse"> |
| 2. |   <s:complexType> |
| 3. |     <s:sequence> |
| 4. |       <s:element minOccurs="0" maxOccurs="1" name="GetTrackingInformationResult" type="tns:Tracking" /> |
| 5. |     </s:sequence> |
| 6. |   </s:complexType> |
| 7. | </s:element> |
| 8. | |
| 9. | <s:complexType name="Tracking"> |
| 10. |   <s:sequence> |
| 11. |     <s:element minOccurs="0" maxOccurs="1" name="OrganizationKey" type="s2:OrganizationKey" /> |
| 12. |     <s:element minOccurs="0" maxOccurs="1" name="BusinessObjectKey" type="tns:BusinessObjectKey" /> |
| 13. |     <s:element minOccurs="0" maxOccurs="1" name="Originator" type="s:string" /> |
| 14. |     <s:element minOccurs="0" maxOccurs="1" name="TimeTracking" type="tns:TimeTracking" /> |
| 15. |     <s:element minOccurs="0" maxOccurs="1" name="Steps" type="tns:ArrayOfTrackingStep" /> |
| 16. |     <s:element minOccurs="1" maxOccurs="1" name="WorkflowApprovalStatus" type="tns:WorkflowApprovalStatus" /> |
| 17. |     <s:element minOccurs="1" maxOccurs="1" name="IsResubmitted" type="s:boolean" /> |
| 18. |   </s:sequence> |
| 19. | </s:complexType> |
| 20. | |
| 21. | <s:complexType name="TimeTracking"> |
| 22. |   <s:sequence> |
| 23. |     <s:element minOccurs="1" maxOccurs="1" name="End" type="s:dateTime" /> |
| 24. |     <s:element minOccurs="1" maxOccurs="1" name="Start" type="s:dateTime" /> |

TABLE 2-continued

Get Tracking Information Response Definition

```
25.      <s:element minOccurs="1" maxOccurs="1" name="DownDays" type="s:int" />
26.      <s:element minOccurs="1" maxOccurs="1" name="DueDate" type="s:dateTime" />
27.    </s:sequence>
28.  </s:complexType>
29.
30.  <s:complexType name="ArrayOfTrackingStep">
31.    <s:sequence>
32.      <s:element minOccurs="0" maxOccurs="unbounded" name="TrackingStep"
nillable="true" type="tns:TrackingStep" />
33.    </s:sequence>
34.  </s:complexType>
35.
36.  <s:complexType name="TrackingStep">
37.    <s:sequence>
38.      <s:element minOccurs="1" maxOccurs="1" name="ApprovalStatus"
type="tns:StepApprovalStatus" />
39.      <s:element minOccurs="0" maxOccurs="1" name="Approvers"
type="tns:ArrayOfTrackingApprover" />
40.      <s:element minOccurs="0" maxOccurs="1" name="StepName" type="s:string" />
41.      <s:element minOccurs="0" maxOccurs="1" name="TimeTracking"
type="tns:TimeTracking" />
42.      <s:element minOccurs="0" maxOccurs="1" name="NextSteps"
type="tns:ArrayOfTrackingStep" />
43.    </s:sequence>
44.  </s:complexType>
45.
46.  <s:complexType name="ArrayOfTrackingApprover">
47.    <s:sequence>
48.      <s:element minOccurs="0" maxOccurs="unbounded" name="TrackingApprover"
nillable="true" type="tns:TrackingApprover" />
49.    </s:sequence>
50.  </s:complexType>
51.
52.  <s:complexType name="TrackingApprover">
53.    <s:sequence>
54.      <s:element minOccurs="0" maxOccurs="1" name="Approver" type="s:string" />
55.      <s:element minOccurs="1" maxOccurs="1" name="ApprovalStatus"
type="tns:ApproverApprovalStatus" />
56.      <s:element minOccurs="0" maxOccurs="1" name="TimeTracking"
type="tns:TimeTracking" />
57.    </s:sequence>
58.  </s:complexType>
```

Table 3 defines the possible approval statuses for a workflow.

TABLE 3

Workflow Approval Status

None
Not Submitted
Submitted
No Approval Needed
Pending Approval
Pending Changes
Approved
Rejected
Workflow Ended
Not Activated
Deactivated Table 4 defines the possible approval statuses for a step.

TABLE 4

Step Approval Status

Approved
Rejected
Request Change
Waiting Response
Not Assigned
Escalated Next Level
Condition Not Met
Canceled Table 5 defines the possible approval statuses for an approver.

TABLE 5

Approver Approval Status

Figure 3:
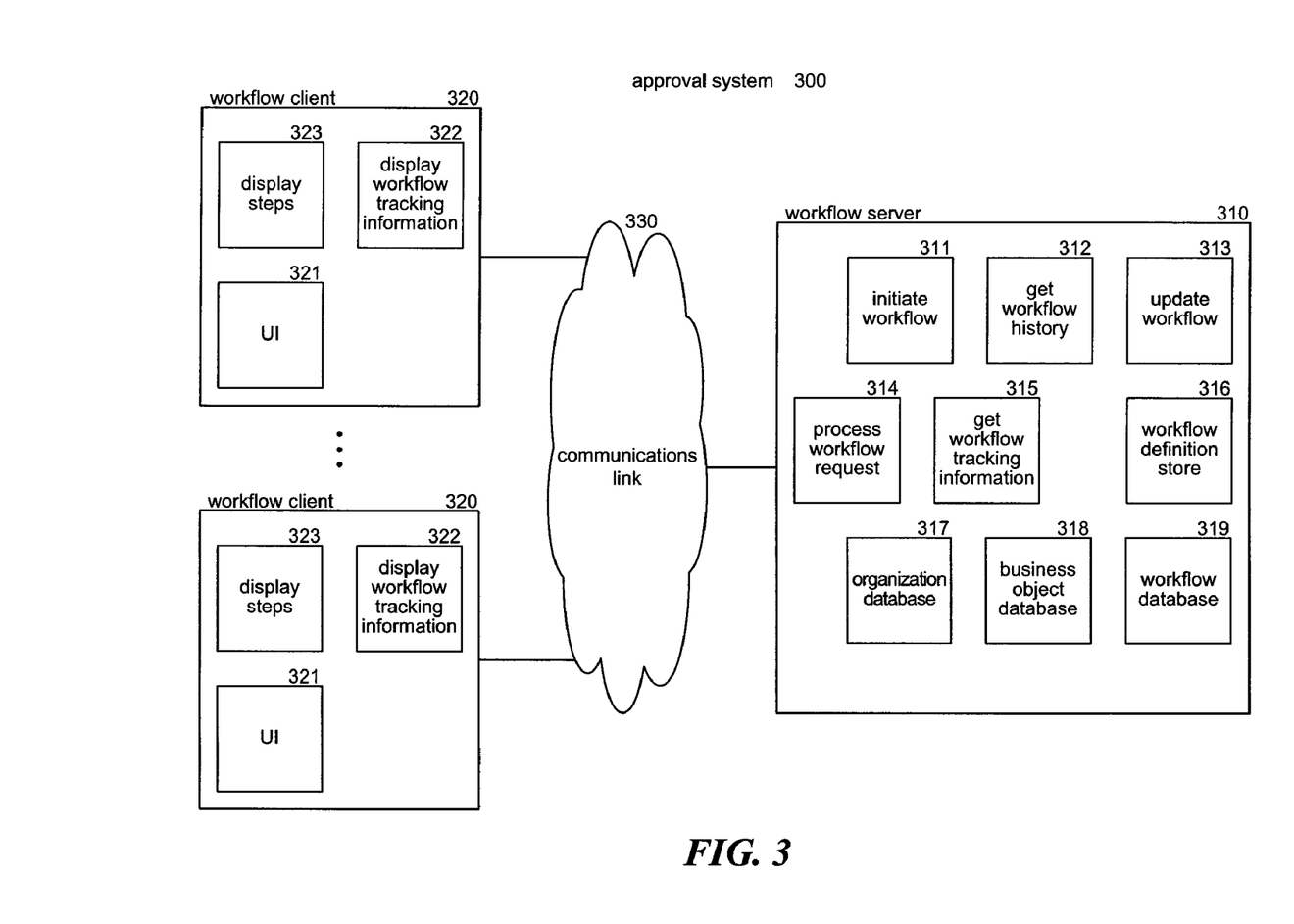
FIG. 3 is a block diagram illustrating components of an approval system in some embodiments.

Approved
Rejected
Request Change
Delegated
Escalated Next Level
Escalated to User
Escalated Auto Approve
Escalated Auto Reject
Waiting Response
Not Assigned
Deleted FIG. 3 is a block diagram illustrating components of an approval system in some embodiments. The approval system 300 may include a workflow server 310 and workflow clients 320 that communicate via communications link 330. The workflow server includes the server-side components of the approval system. The server-side components include a define workflow component 311, a get workflow history component 312, an update workflow component 313, a process workflow request component 314, a get workflow tracking information component 315, a workflow definition store 316, an organization database 317, a business object database 318, and a workflow database 319. The process workflow request component receives requests from workflow clients to initiate workflows for business objects, request workflow tracking information, and so on. The process workflow request component invokes the initiate workflow component, the get workflow history component, the update workflow component, or the get workflow tracking information component to process each request as appropriate. The workflow definition store stores the definitions of workflows such as a purchase order workflow. The organization database stores information relating to the various organizations that use the workflow server for storing workflow information. The business object database stores the business objects of the organizations that use the workflow server. The workflow database stores information describing the assignment of workflows to business objects along with status information for tracking the processing of the workflows. When the process workflow request component receives a request for workflow tracking information, it invokes the get workflow tracking information component. The get workflow tracking information component accesses the workflow database to retrieve the tracking information and provides it to the process workflow request component for sending to the requesting workflow client.

A workflow client includes the client-side components of the approval system. The client-side components include a user interface component 321, a display workflow tracking information component 322, and a display steps component 323. As described below in more detail, the functionality of the multiple components can be combined into a single component or the functionality of a single component can be divided into multiple components. For example, the functionality of the display workflow tracking information component and the display steps components can be combined into a single component. The client-side components may also include other components for defining workflows, modifying workflows, assigning workflows to business objects, and so on. The user interface component controls the overall user interface of the client-side components. When a user requests to display workflow tracking information, the user interface component sends a request for the workflow tracking information to the workflow server. Upon receiving the requested workflow tracking information, the user interface component invokes the display workflow tracking information component. The display workflow tracking information component displays the overall tracking information for a workflow and then invokes the display steps component to display the steps of the workflow. The display steps component recursively invokes itself to process the next steps of each step.

The computing device on which the approval system is implemented may include a central processing unit, memory, input devices (e.g., keyboard and pointing devices), output devices (e.g., display devices), and storage devices (e.g., disk drives). The memory and storage devices are computer-readable media that may be encoded with data structures and computer-executable instructions that implement the approval system, which means a computer-readable medium that contains the data structures and the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the approval system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The approval system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
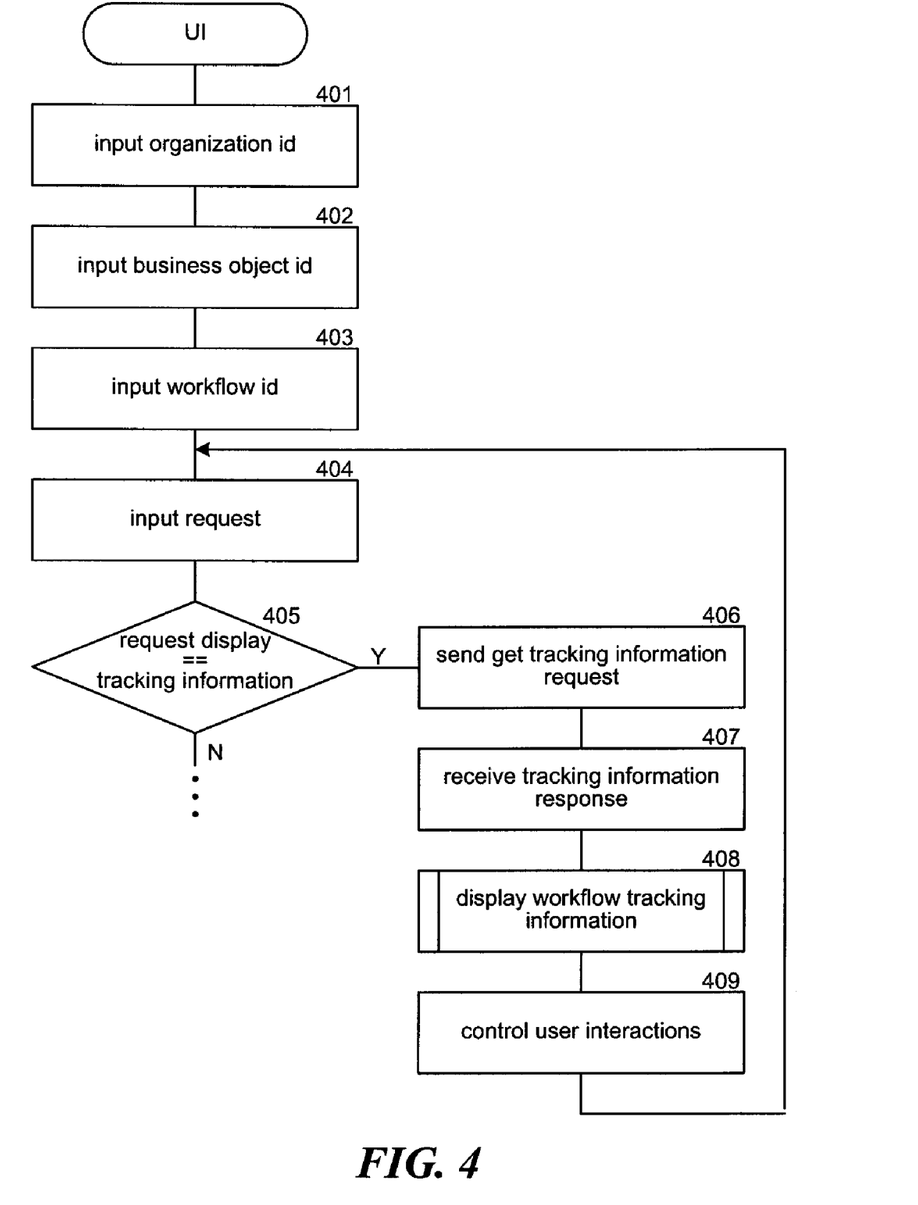
FIG. 4 is a flow diagram that illustrates the processing of the user interface component of the approval system in some embodiments.

FIG. 4 is a flow diagram that illustrates the processing of the user interface component of the approval system in some embodiments. The user interface component may initially prompt a user to identify a business object and then input requests from the user for accessing the workflow information of the business object. In block 401, the component inputs an organization identifier of the user. In block 402, the component inputs a business object identifier for the business object whose workflow is to be accessed. In block 403, the component inputs a workflow identifier of a workflow assigned to the business object. In block 404, the component inputs from a user a request for accessing the workflow. In decision block 405, if the request is to display tracking information, then the component continues at block 406, else the component continues to process other requests by the user. In block 406, the component sends a get tracking information request to the workflow server that identifies the organization, business object, and workflow. In block 407, the component receives a tracking information response from the workflow server. In block 408, the component invokes the display workflow tracking information component to display the tracking information in a tree-like representation. A tree-like representation illustrates the relationship between parallel steps and dependent steps as a tree with a root node, intermediate nodes, and leaf nodes. The intermediate nodes and the leaf nodes represent the steps of the workflow. In block 409, the component controls the user interactions with the displayed tree-like representation. The interactions may include expanding and collapsing nodes. The component then loops to block 404 to process the next request by the user.

Figure 5:
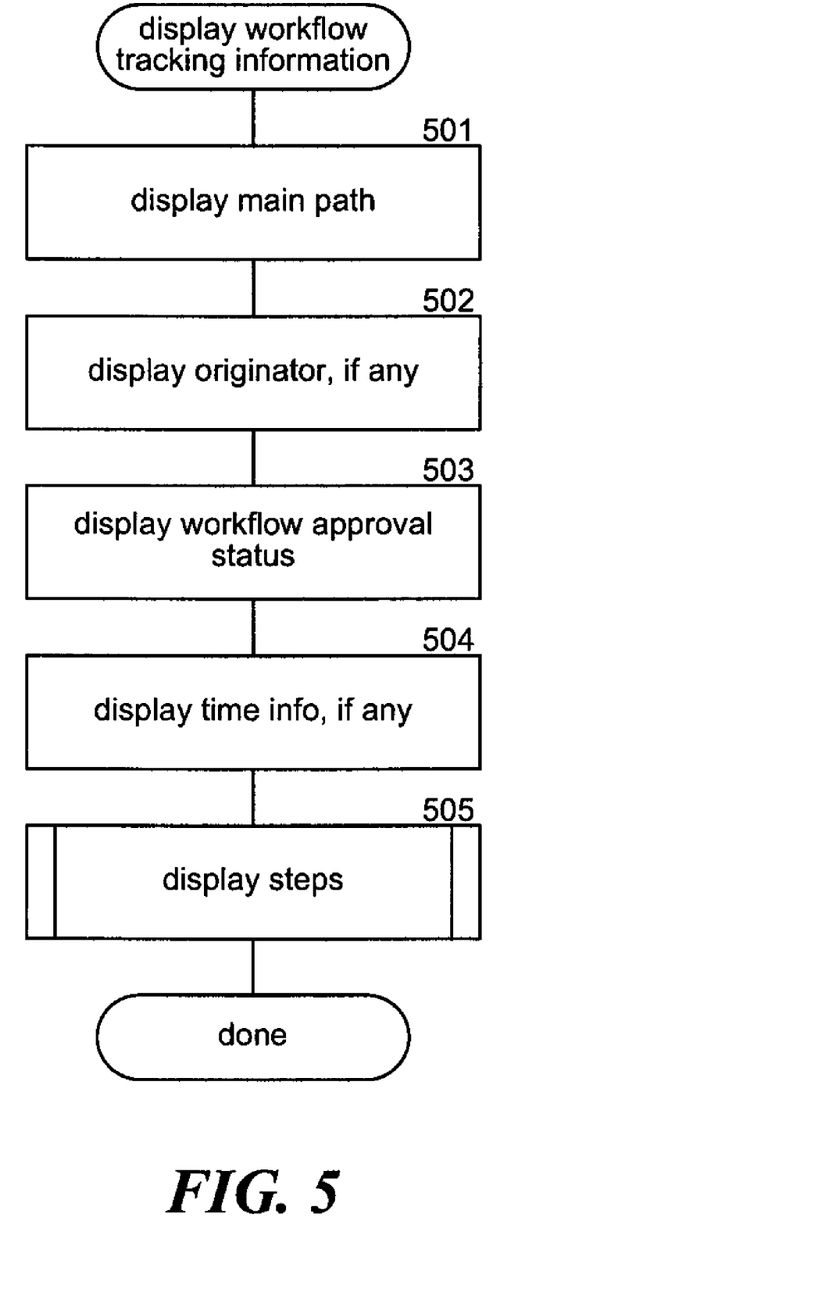
FIG. 5 is a flow diagram that illustrates the processing of the display workflow tracking information component of the approval system in some embodiments.

FIG. 5 is a flow diagram that illustrates the processing of the display workflow tracking information component of the approval system in some embodiments. The component is passed workflow tracking information and displays the overall tracking information and invokes the display steps component to display the steps of the workflow. In block 501, the component displays an indication of the main path of the workflow. In block 502, the component displays the name of the originator of the business object. In block 503, the component displays the workflow approval status. In block 504, the component displays time tracking information of the workflow, if any. In block 505, the component invokes the display steps component and then completes.

Figure 6:
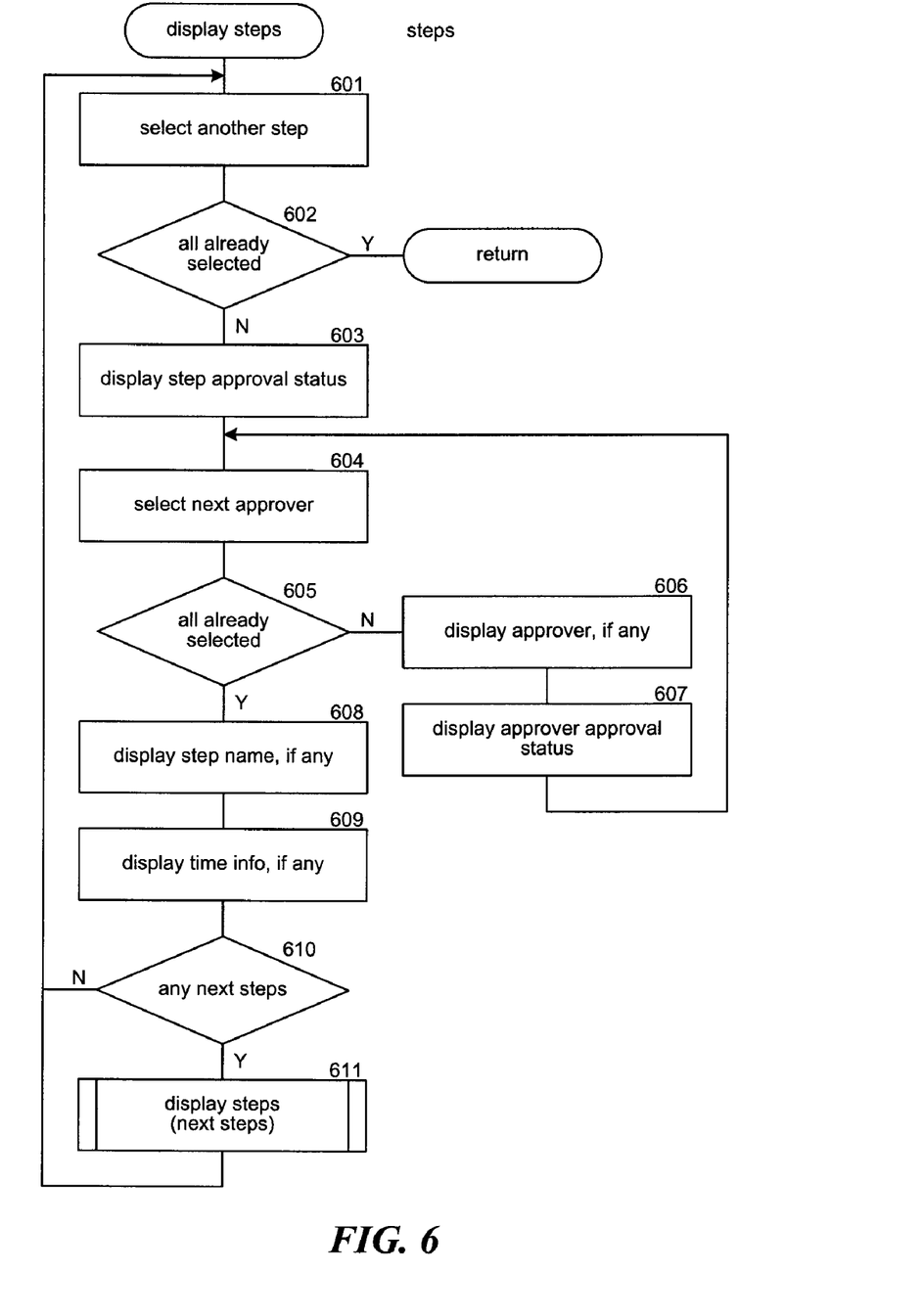
FIG. 6 is a flow diagram that illustrates the processing of the display steps component of the approval system in some embodiments.

FIG. 6 is a flow diagram that illustrates the processing of the display steps component of the approval system in some embodiments. The component is passed steps defined by tracking information and loops displaying each step and recursively invoking the component for any next steps. In block 601, the component selects another step. In decision block 602, if all the passed steps have already been selected, then the component returns, else the component continues at block 603. In block 603, the component displays the step approval status for the selected step. In blocks 604-607, the component loops displaying approver information for the selected step. In block 604, the component selects the next instance of approver information. In decision block 605, if all the instances of approver information for the selected step have already been selected, then the component continues at block 608, else the component continues at block 606. In block 606, the component displays the name of the approver, if any. In block 607, the component displays the approver approval status and then loops to block 604 to select the next instance of the approver information. In block 608, the component displays a step name, if any. In block 609, the component displays time tracking information, if any. In decision block 610, if any next steps have been defined, then the component continues at block 611, else the component loops to block 601 to select another step. In block 611, the component recursively invokes the display steps component passing the next steps of the selected step. The component then loops to block 601 to select another step.

Figure 7:
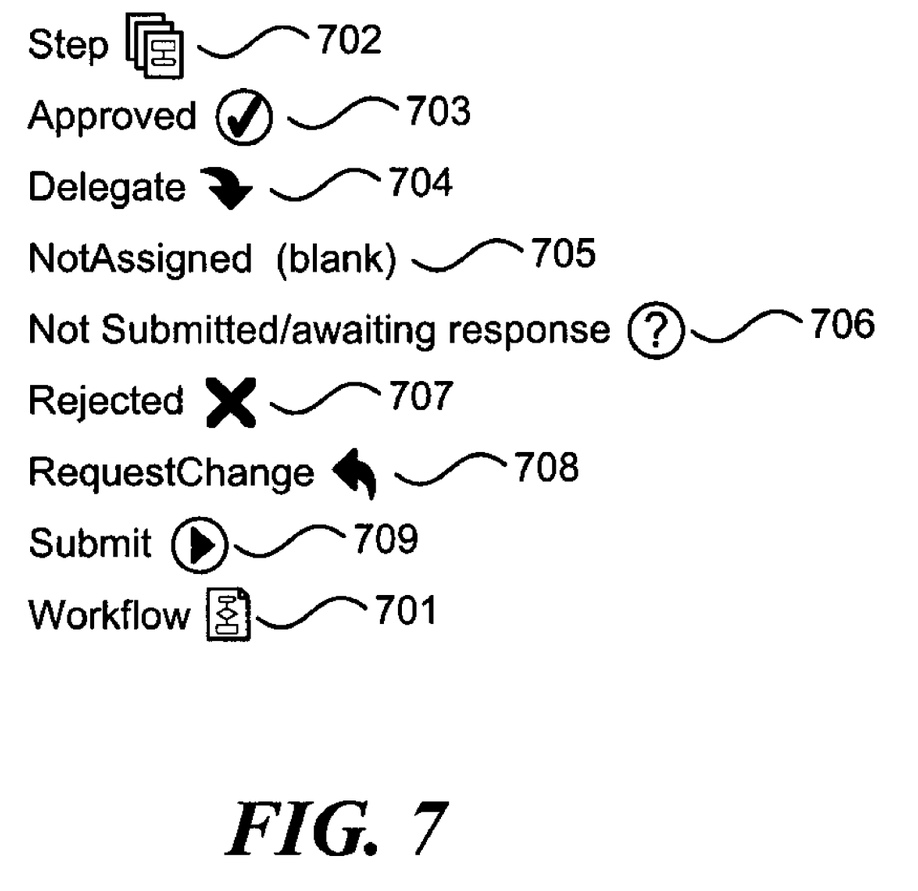
FIG. 7 illustrates icons representing various statuses of the approval system in some embodiments.

FIG. 7 illustrates icons representing various statuses of the approval system in some embodiments. Icons 701 and 702 represent the overall workflow and steps within the workflow, respectively. Icons 703-709 represent various approval statuses of the steps.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for presenting workflow tracking information for workflows assigned to business objects, a workflow specifying approval steps for a business object, the method comprising:
    receiving from a user an identification of a business object with an assigned workflow;
    sending to a server a request to retrieve tracking information for the identified business object and assigned workflow;
    receiving from the server the requested tracking information for the identified business object and assigned workflow, the tracking information including a workflow approval status, an originator identifier identifying an originator, and a plurality of steps of the assigned workflow, a step including a step name, a step approval status, approver tracking information, and zero or more next steps, each instance of approver tracking information including an approver identifier and an approver approval status, each next step including one or more steps, wherein at least one of the plurality of steps includes a next step;
    generating a display of the received tracking information, the display indicating the workflow approval status and the originator and providing a tree-like representation that includes:
        a root node at a first level representing the workflow and identifying the business object, and the originator of the workflow;
        for each first step of the workflow, a node at a second level representing that first step and identifying the step name, and the step approval status of the first step; and
        for each next step of each first step of the workflow, a node at a third level representing that next step and identifying the step name, and the step approval status of that next step
        wherein the display includes a line between the root node and each node representing a first step and between each node representing a first step and each node representing a next step of that first step, and
        wherein the workflow includes multiple first steps or a first step includes multiple next steps; and
    outputting to the user the generated display.

2. The method of claim 1 wherein an approver approval status is represented by an icon.

3. The method of claim 1 wherein a step includes a condition indicating whether the approval of that step is needed and wherein when the condition is not met, indicating on the display that approval of that step and any of its next steps is not needed.

4. The method of claim 3 wherein the indicating that approval of a step is not needed includes graying out of the node representing the step and any node representing any of its next steps.

5. The method of claim 1 including controlling manipulation of the generated display by the user.

6. The method of claim 5 wherein the manipulation includes expanding and collapsing of nodes representing next steps of a step.

7. The method of claim 1 wherein the received tracking information includes an originator and organization of the identified business object.

8. The method of claim 1 wherein the received tracking information includes time tracking information for the workflow, a step, and approver tracking information.

9. The method of claim 1 wherein the display includes nodes for all steps of the workflow.

10. The method of claim 1 wherein a step includes a plurality of approvers.

11. The method of claim 10 wherein a rule specifies how to derive the step approval status for a step from the approver approval statuses of the approvers.

12. A computer-readable storage device encoded with a data structure for storing tracking information of a workflow assigned to a business object that is a document corresponding to a task to be performed, the workflow being one of a plurality of workflows for assigning to different types of documents, the data structure for tracking information for workflows assigned to different types of documents, the data structure comprising:
    an organization identifier associated with the business object;
    a business object identifier of the business object;
    time tracking information for the workflow;
    a workflow approval status for the workflow;
    an originator identifier of the originator who initiated the workflow for the business object; and
    a plurality of steps, each step including a step approval status, one or more instances of approver tracking information, a step name, time tracking information, and zero or more next steps, each instance of approver tracking information including an approver whose approval is needed to authorize the task of the document to be performed and an approver approval status, each next step including one or more steps, wherein at least one of the plurality of steps includes a next step.

13. The computer-readable storage device of claim 12 wherein the steps define parallel approval paths of the workflow.

14. The computer-readable storage device of claim 12 wherein at least one step approval status for a step indicates approval and at least one step approval status for a step indicates pending approval.

15. The computer-readable storage device of claim 12 wherein the time tracking information includes a due date for approval and a start and end time for approval.

16. The computer-readable storage device of claim 12 wherein the business object represents a document.

17. The computer-readable storage device of claim 12 wherein the business object represents an object of a business application.

18. A computer-readable storage device encoded with instructions for controlling a computing device to present workflow tracking information for workflows assigned to business objects, by a method comprising:
  sending to a server a request to retrieve tracking information for a business object and an assigned workflow;
  receiving from the server the requested tracking information for the business object and assigned workflow, the tracking information including a workflow approval status and a plurality of steps of the assigned workflow, a step including a step name, a step approval status, an approver, and zero or more next steps, each next step including one or more steps, wherein at least one of the plurality of steps includes a next step;
  generating a display of the received tracking information, the display indicating the workflow approval status and providing a tree-like representation that includes:
    for each first step of the workflow, a node at a first level representing that first step and identifying the step name, and the step approval status of the first step;
    for each next step of each first step of the workflow, a node at a second level representing that next step and identifying the step name, and the step approval status of that next step; and
    for each next step of each next step of each first step of the workflow, a node at a third level representing that next step and identifying the step name, and the step approval status of that next step
    wherein the display includes a line between each node representing a step and each node representing a next step of that step, and
    wherein the workflow includes a step with multiple next steps; and
  outputting to a user the generated display.

19. The computer-readable storage device of claim 18 wherein each step includes one or more approvers and, for each approver, an approver approval status.

20. The computer-readable storage device of claim 18 wherein each step includes time tracking information indicating approval due date for the step.

\* \* \* \* \*

UNITED STATES PATENT AND TRADEMARK OFFICE
CERTIFICATE OF CORRECTION

PATENT NO. : 8,151,208 B2
APPLICATION NO. : 12/027966
DATED : April 3, 2012
INVENTOR(S) : Sogge et al.

Page 1 of 1

It is certified that error appears in the above-identified patent and that said Letters Patent is hereby corrected as shown below:

IN THE CLAIMS:

In column 14, line 13, in Claim 18, delete "each next step of each next step" and insert -- each next step --, therefor.

Signed and Sealed this
Tenth Day of February, 2015

Michelle K. Lee
*Deputy Director of the United States Patent and Trademark Office*